United States Patent
Maddocks et al.

(10) Patent No.: US 9,826,341 B2
(45) Date of Patent: Nov. 21, 2017

(54) DEVICE CONTENT PROVISIONING SYSTEM

(71) Applicant: MasterCard International Incorporated, Purchase, NY (US)

(72) Inventors: Ian David Alan Maddocks, Milton Keynes (GB); Simon Phillips, York (GB)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 15/077,031

(22) Filed: Mar. 22, 2016

(65) Prior Publication Data

US 2016/0286342 A1 Sep. 29, 2016

(51) Int. Cl.
| | |
|---|---|
| *H04B 7/00* | (2006.01) |
| *H04W 4/00* | (2009.01) |
| *G06Q 20/32* | (2012.01) |
| *G06Q 30/06* | (2012.01) |

(52) U.S. Cl.
CPC ............ *H04W 4/008* (2013.01); *G06Q 20/32* (2013.01); *G06Q 20/3278* (2013.01); *G06Q 30/0601* (2013.01)

(58) Field of Classification Search
CPC ... H04W 4/008; G06Q 20/3278; G06Q 20/32; G06Q 30/0601; H04B 17/30
USPC ..................................... 455/41.1, 41.2, 41.3
See application file for complete search history.

(56) References Cited

U.S. PATENT DOCUMENTS

| | | | | |
|---|---|---|---|---|
| 8,676,161 | B2 * | 3/2014 | Phillips | ............. G06Q 20/3226 455/410 |
| 2002/0027494 | A1 * | 3/2002 | Watanabe | ............... G06F 21/32 340/5.81 |
| 2010/0087167 | A1 * | 4/2010 | Tsurutome | .......... H04L 67/2814 455/411 |

(Continued)

FOREIGN PATENT DOCUMENTS

| | | |
|---|---|---|
| EP | 1215853 A2 | 6/2002 |
| EP | 2863705 A1 | 4/2015 |

OTHER PUBLICATIONS

"Patents Act 1977: Search Report under Section 17", dated Aug. 25, 2015, Intellectual Property Office, 1pg.

*Primary Examiner* — Md Talukder
(74) *Attorney, Agent, or Firm* — Buckley, Maschoff & Talwalkar LLC

(57) ABSTRACT

The present disclosure relates to a method and system for provisioning a portable electronic device comprising a first short-range communications module, with content data from a networked remotely located content provider, using an electronic bridging device. The method comprises the steps of: establishing a first communication channel between a networked electronic bridging device and the portable electronic device, the electronic bridging device comprising a second short-range communications module, and the first communication channel being established using the first and second short-range communications module; establishing a second communication channel between the networked electronic bridging device and the networked remotely located content provider; provisioning the portable electronic device with the content data by transmitting the content data from the remotely located content provider to the portable electronic device using the first and second communication channels.

20 Claims, 3 Drawing Sheets

(56) References Cited

U.S. PATENT DOCUMENTS

| | | | |
|---|---|---|---|
| 2013/0060708 A1* | 3/2013 | Oskolkov | G06Q 20/3223 705/75 |
| 2013/0067216 A1* | 3/2013 | Tanner | H04L 9/3234 713/155 |
| 2013/0171929 A1* | 7/2013 | Adams | H04W 4/008 455/41.1 |
| 2014/0101036 A1* | 4/2014 | Phillips | G06Q 20/027 705/39 |
| 2016/0020804 A1* | 1/2016 | Lee | H04B 1/3816 455/558 |

* cited by examiner

DEVICE CONTENT PROVISIONING SYSTEM

CROSS-REFERENCED TO RELATED APPLICATION

This application is a U.S. National Stage filing under 35 U.S.C. §119, based on and claiming benefit of and priority to GB Patent Application No. 1504879.6 filed Mar. 23, 2015.

TECHNICAL FIELD

The present disclosure relates to the field of information technology, and specifically to a system and method for provisioning a portable electronic device having limited communications functionality, with content data from a remotely located content provider, using a bridging device, in order to impart new functionality to the portable electronic device.

BACKGROUND

Recent times have seen a surge in the use of contactless functionality in consumer electronic devices, and in particular in the smartphone market. For example, smartphones configured with near-field communication (NFC) functionality can now be used as contactless payment devices, as exemplified by Apple's Apple Pay™ and Google's Google Wallet™ contactless payment systems. In such systems the existing internet connectivity of smartphones is used by payment card issuers to provide the smartphone with the required data content to enable the smartphone to participate in payment transactions with a contactless payment terminal (commonly known as a Point of Sale device or POS). In practice, this is implemented by requiring that the user download the service provider's user interface application, commonly known as a wallet, to the smartphone. As part of the application configuration process, user registration is required to identify the user and the payment card they wish to enable or digitize on their smartphone with the service provider. Details such as any one of name, address, social security number, card, and bank account details may be provided during the registration process. Using the information provided by the user along with details of the smartphone, the service provider is able to validate the eligibility of the request and if compatible, construct a unique digitized card, which is securely transmitted to the specific smartphone. To improve security, smartphones are provided with a secure element, which is effectively a protected processing area, which may be implemented either in hardware or software. The unique digitized card is transmitted from the service provider to the smartphone's secure element, and enables the service provider to identify the digitized card during subsequent transactions. Once installed and configured with the digitized card, the smartphone may participate in payment transactions with a contactless payment terminal using its native NFC functionality.

NFC communication relates to a specific set of standards of radio communication for smartphones and other, typically portable, consumer electronic devices. Communication between a smartphone or other consumer device and a receiver is typically established by bringing the device in close proximity (usually no more than a few centimeters) with a receiver. The NFC standards cover protocols and data exchange formats, and are based on existing radio-frequency identification (RFID) standards including ISO/IEC 14443 and FeliCa for standards shared with plastic card form factors. In addition, the NFC standards include ISO/IEC 18092 and those defined by the NFC Forum. In addition to the NFC Forum, the GSM Association (GSMA), which is an association of mobile telephone operators and related companies, has also defined a set of standards referred to as the GSMA NFC Standards for the deployment of NFC protocols within mobile telephones, including smartphones.

Short range radio communications, of which NFC is one example, have been used in other industries as well with much success. For example, in the automotive industry, electronic key fobs have for the most part now replaced the use of traditional physical keys for accessing and operating vehicles. In such applications, the electronic key fob emits a unique radio signal, which is recognised by the associated vehicle and unlocks, and in certain implementations, enables operation of the vehicle. Modern key fobs can also be configured with a storage medium enabling a user profile setting to be stored therein. In this way, when the key is used to activate a vehicle, the vehicle may also be configured in accordance with a driver profile setting stored on the key fob. For example, the driver profile setting may comprise any one or more of the following: driver seat position; steering wheel position; radio station; mirror positions (including side mirrors and rear view mirror); and interior temperature settings.

Vehicle key fobs typically comprise electronic circuitry comprising a processor, a transmitter for transmitting at the required radio frequency, and a storage device for storing the algorithms required to generate the unique radio signal, and any other required data, such as a user profile.

Vehicle key fobs are typically configured at the source of manufacture with the algorithms required to generate the unique radio signal. The user profile is often generated and stored local to the key fob when the key fob is inserted into the ignition, thereby establishing a physical connection with the vehicle's native processing unit. This enables settings selected by the user using the vehicle's native interface, to be stored on the key fob.

A shortcoming of existing vehicle key fob solutions is that the adopted communications protocols cannot be updated over the air. Instead, the key fob must be brought to the manufacturer for updating, and/or replacement. This may be required, for example where the security of the previous protocol has become compromised. In such circumstances, the replacement of compromised algorithms with more secure algorithms is of utmost importance. Currently, to deal with such scenarios, recalls are issued by the manufacturer. It is subsequently the user's responsibility to comply with the recall request and to schedule an appointment with the manufacturer. This solution is time consuming and relies on informed and proactive users.

The consumer electronics market has also seen the growth of wearable technology, which relates to smart electronic devices a consumer wears, such as watches and fitness bands. As with key fobs, these devices comprise support for short range data communications, a processor and storage. The communications protocols utilised are commonly Bluetooth Low Energy (BLE) or NFC, to facilitate the exchange of data between the wearable device and the consumer's smartphone or computer. However, such wearable devices are often unable to communicate with a remotely located service provider, due to the absence of long range communications means, such as a mobile telecommunications interface, or network connectivity means.

The above highlights a problem that consumers are unable to update their consumer electric devices configured with short-range communications functionality with content data and functionality provided from a range of service providers, such as payment card issuers providing contactless payment capability, and suppliers of access control systems. Examples of current access control systems may relate to systems used to restrict access to facilities, such as those commonly used in the hotel industry to restrict access to rooms, where typically a designated electronic key card is required to unlock a secure door.

SUMMARY OF THE DISCLOSURE

Against this background, an aspect of the disclosure relates to a method of provisioning a portable electronic device with content data from a networked remotely located content provider, the portable electronic device comprising a first short-range communications module, the method comprising the steps of: establishing a first communication channel between a networked electronic bridging device and the portable electronic device, the electronic bridging device comprising a second short-range communications module, and the first communication channel being established using the first and second short-range communications module; establishing a second communication channel between the networked electronic bridging device and the networked remotely located content provider; provisioning the portable electronic device with the content data by transmitting the content data from the remotely located content provider to the portable electronic device using the first and second communication channels.

The portable electronic device may comprise a secure element operatively connected to the first short-range communications module. The portable electronic device may comprise a consumer electronic device such as a key fob or a smartwatch. The secure element is configured to provide a secure processing environment in which the confidentiality of data received via the first short-range communications module is maintained. The provisioning step comprises storing the content data in the secure element. The secure element helps to maintain the confidentiality of content data (information content) provisioned to the portable electronic device. This is particularly useful when the content data relates to confidential financial transaction algorithms and/or cryptographic algorithms and keys.

The secure element may be configured in accordance with the GlobalPlatform standards which provide standards on secure point to point content management. An advantage of using the GlobalPlatform standards for implementing aspects of the disclosure is that it provides an existing means for creating a secure, bridged communication channel between the remotely located content provider and the portable electronic device, via the bridging device. It also defines an existing smartcard operating system in which executable files may be transmitted between configured devices. Furthermore, several existing mobile transaction systems, including but not limited to payment systems, such as Google Wallet™ and Softcard™ for example, are compliant with the GlobalPlatform standard, and therefore configuring the secure element in accordance with the Global-Platform standards enables seamless integration with existing transaction systems that are compliant with the GlobalPlatform standard.

In certain embodiments, the portable electronic device may comprise a processor operatively communicable with the first short-range communications module, and the content data may relate to an executable data file associated with a functionality, and the method may further comprise the steps of: executing the received executable data file on the portable electronic device using the processor; and configuring the portable electronic device with the functionality associated with the executable data file.

The executable data file may relate to a payment application, and the configuring step may comprise configuring the portable electronic device with payment functionality enabling the portable electronic device to initiate a financial transaction with a point of sale terminal using the portable electronic device's first short-range communications module.

In certain embodiments, the portable electronic device's first short-range communications module may comprise any one of: a near-field communications (NFC) module; a Bluetooth communications module; a ZigBee communications module; or a short-range infrared communications module.

The first communication channel may be established using a local communications device available to the portable electronic device, such as NFC or BLE, which is capable of receiving and transmitting data.

In certain embodiments, the electronic bridging device may comprise a smartphone, and the second communication channel comprises a telecommunications network. In other words, the second communication channel may be established with the remotely located content using the smartphone's telecommunications network. The use of a smartphone as the electronic bridging device is convenient given their wide adoption rate, and that most users of the present method will possess one. Advantageously, this means that a user's existing smartphone may be adapted to carry out the present method, and the user is not required to purchase any new special purpose hardware apparatus.

In certain embodiments the method may further comprise receiving, at the networked electronic bridging device, an executable application from the remotely located content provider, following establishment of the second communication channel, via the second communication channel. The method may further comprise installing the executable application on the electronic bridging device, the electronic bridging device being configured to receive and store the content data received from the remotely located content provider, when the executable application is installed; and transmitting the received content data to the portable electronic device via the first communication channel, when the first communication channel is established.

The executable application may be used to manage data transactions between the remotely located content provider and the portable electronic device, using the bridging device.

In certain embodiments, user registration may be required before content data can be transferred from the remotely located content provider to the portable electronic device. User registration may be carried out using a User Interface of the electronic bridging device, wherein the user inputs their personal details into the electronic bridging device, which details are subsequently transferred from the electronic bridging device to the remotely located content provider. The user's personal details may relate, for example, to any one of name, address, social security number, bank and/or user payment account details.

The method may further comprise transferring information regarding the characteristics of the portable electronic device to the remotely located content provider. For example, the executable application may be configured to retrieve information regarding the characteristics of the portable electronic device from the portable electronic device, when the first communication channel is established, and transferring this information to the remotely located content provider using the second communication channel.

This information is subsequently stored by the remotely located content provider and may be used to validate the portable electronic device in a subsequent transaction. This improves the end-to-end security of subsequently executed transactions.

The characteristics of the portable electronic device may relate to device eligibility information, defining the types of data that the portable electronic device is configured to process.

The electronic bridging device may comprise a short-range communications module, such as WiFi, arranged to enable the second communication channel to be secured, by means of SSL or TLS for example. This ensures that all transactions between the bridging device and the remotely located content provider are secure.

Preferably the first and second communication channels are secure communication channels and the data exchanges between the remotely located content provider, the bridging device and the portable electronic device adheres to the Global Platform secure content management specifications (or similar alternatives).

Once the desired content data has been transferred to and installed on the portable electronic device, the portable electronic device may provide new functionality in accordance with the installed content data. For example, this method of provisioning the portable electronic device with new content data, can be used to configure the portable electronic device to participate in payment transactions with a contactless payment terminal using its native short-range communications module.

In this way, by making use of the networked functionality of the bridging device, new content data and functionality may be imparted to the portable electronic device having limited communications capabilities when located remotely from a content provider.

A second aspect of the disclosure relates to an electronic bridging device comprising: a first communication means arranged to establish a first communication channel with a portable electronic device; a second communication means arranged to establish a second communication channel with a remotely located content provider; and wherein the electronic bridging device is configured to receive content data from the remotely located content provider via the second communication channel, and to forward the received content data to the portable electronic device via the first communication channel. The first communications module may relate to a short-range communications module such as BLE, NFC, ZigBee, or a short-range infrared communications module. Once the first and second communication channels have been established, the electronic bridging device may be arranged to enable content data received from the remotely located content provider to be forwarded for processing by the portable electronic device.

A third aspect of the disclosure relates to a content provider located remotely from an electronic bridging device and a portable electronic device, the content provider being arranged to establish a second communication channel with the electronic bridging device, and forwarding to the electronic bridging device content data for execution on the portable electronic device when a first communication channel has been established between the portable electronic device and the electronic bridging device.

A fourth aspect of the disclosure relates to a method of provisioning a portable electronic device with content data from a networked remotely located content provider using a networked electronic bridging device, the portable electronic device comprising a first short-range communications module and the electronic bridging device comprising a second short-range communications module, the method comprising: establishing a first communication channel between the portable electronic device and the electronic bridging device using the first and second short-range communications module; establishing a second communication channel between the electronic bridging device and the remotely located content provider; receiving content data from the remotely located content provider at the electronic bridging device via the second communication channel, and forwarding the received content data to the portable electronic device via the first communication channel.

BRIEF DESCRIPTION OF THE FIGURES

To facilitate the reader's understanding of the disclosure, embodiments of the disclosure will now be described, by way of non-limiting example, with reference to the following figures, in which.

DETAILED DESCRIPTION

The method of embodiments of the present disclosure may be applied to provision any portable electronic device, and in particular a portable consumer electronic device, having limited, short-range communications functionality with additional content data, from a remotely located content provider. Embodiments of the method are particularly well suited for provisioning portable (consumer) electronic devices having no native means for communicating directly with remotely located content providers, but comprising short range communication means and associated processing means, with additional content data. This additional content data can then be used to configure the electronic device with new functionality. However, in order to facilitate the reader's understanding of the disclosure, an embodiment of the disclosure will be described below in which the electronic device is an electronic key fob for a vehicle. This is for illustrative, non-limiting purposes only.

Figure 1:
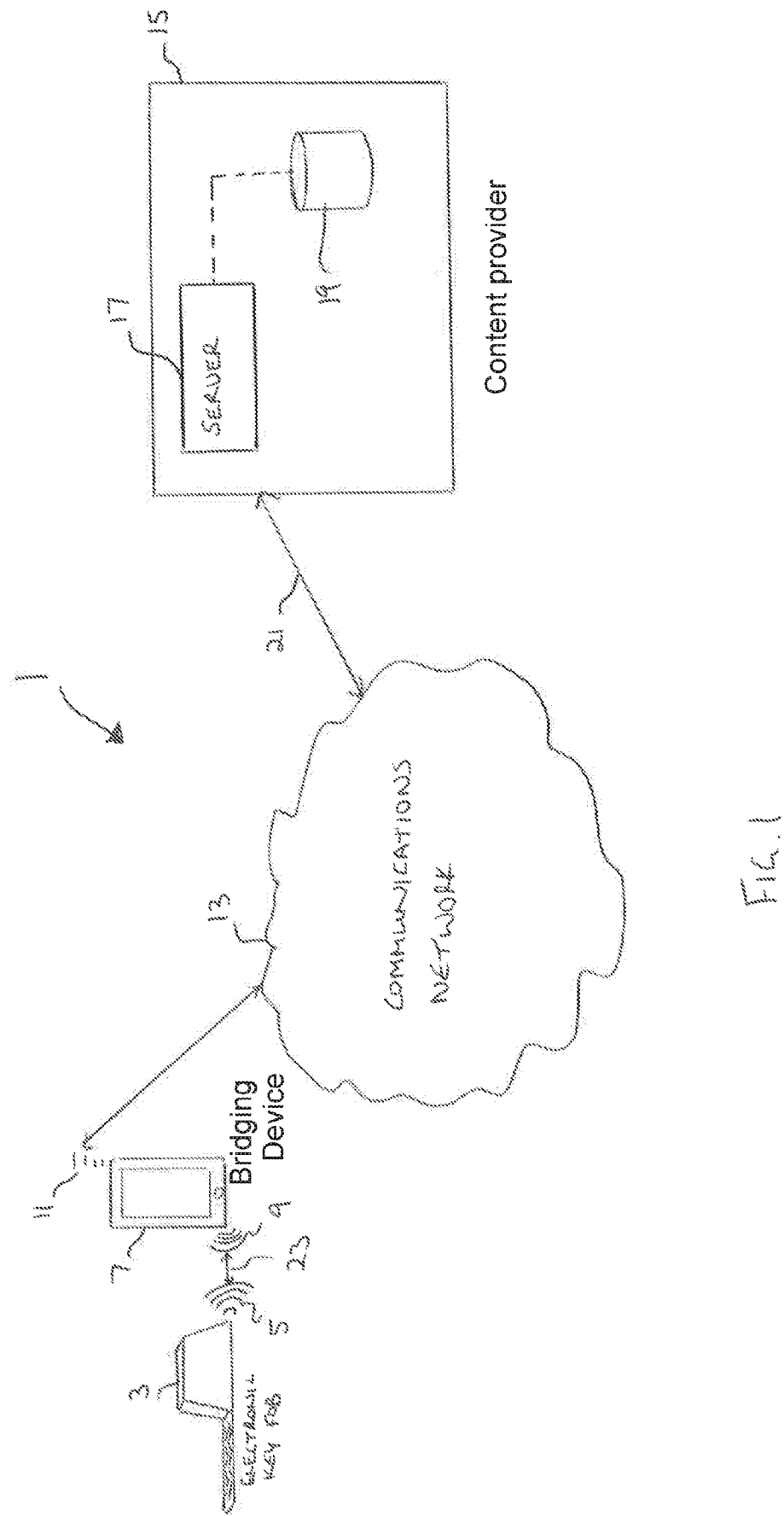
FIG. 1 is a schematic overview of a system, in accordance with an embodiment of the disclosure, in which a vehicle key fob having NFC functionality is provisioned with content from a remotely located content provider, via a bridging device.

FIG. 1 illustrates a system 1 comprising an electronic key fob 3 for a vehicle. The electronic key fob 3 comprises a short-range radio communications transceiver 5 and associated processing means, for processing received communications. The short-range communications transceiver 5 may comprise a near-field communications (NFC) transceiver for receiving and emitting near-field communications signals with another NFC-enabled device located in close proximity to the key fob 3. For further details regarding the implementation of NFC, the interested reader is referred to the following website http://en.wikipedia.org/wiki/Near_field_communication.

The system 1 further comprises an electronic bridging device 7, such as a smartphone, configured with both a short-range communications transceiver 9, which short-range communications transceiver may relate to an NFC transceiver, and a long-range communications means 11 enabling a communication channel to be established with a remotely located server, via a shared communications network 13 such as the internet. The bridging device's short-range communications transceiver 9 is communicable with the key fob's short-range communications transceiver 5.

The system also comprises a content provider 15 located remotely from both the bridging device 7 and the electronic key fob 3. The content provider 15 comprises a server 17 and a storage device 19. The storage device 19 comprises data content, which data content may comprise executable software code, which when sent to and later executed on an electronic device, such as the key fob 3, imparts new functionality to the electronic device. The content provider 15 is provided with a communications channel 21 for establishing a connection with the shared communications network 13, which shared communications network may relate to the internet.

To enable new content to be provisioned to the electronic key fob 3, a first communication channel 23 is established between the key fob 3 and the bridging device 7, using each respective device's short range communications transceivers 5, 9. A second communication channel is established between the bridging device 7 and the content provider 15, using the bridging device's long-range communications means 11, the content provider's communications channel 21, and the shared communications network 13, which in certain embodiments may relate to the internet, or any other wide access network (WAN). Once both the first 23 and the second communications channels have been established, the remotely located content provider 15 forwards content data, which content data may relate to executable software code, to the electronic key fob 3 via the bridging device 7. In this way, content data that was not initially provided on the electronic key fob 3 at the source of manufacture, may be provided to the key fob 3, using the existing communications means native to the bridging device 7. In other words, the existing communications means of the bridging device are used to enable the key fob 3 to establish a communication path with the remotely located content provider 15, thus enabling the electronic key fob 3 to communicate with the content provider 15.

Where the content data relates to executable software code, such as an executable data file (e.g. an executable application), then the executable data file may be executed by the key fob's local processor, and the key fob 3 is configured with additional functionality associated with the executable data file.

Embodiments of this method may be used to provide the key fob 3 with payment functionality. For example, where the key fob 3 comprises an NFC transceiver and associated processing device, a communication channel may be established via the bridging device 7 to a credit/debit card issuer. In this example, the credit/debit card issuer is the content provider 15, and provisions the key fob 3 with the required hashing algorithms, transaction algorithms, and cryptographic keys required to securely participate in a financial transaction, using the established communication channels. Once provisioned with the required transaction protocols and accordingly configured, the key fob 3 can be used in place of an NFC-enabled credit/debit card, to execute financial transactions using an NFC point-of-sale terminal.

In certain embodiments, in order to improve the security of the present method, the electronic bridging device 7 is configured with an application (often commonly referred to as an "app") received from the remotely located content provider 15, which application is arranged with the protocols required to establish a secure communication channel with the remotely located content provider 15. For example, the content provider's application may be configured with secure cryptographic encryption keys required to ensure that data communications between the content provider 15 and the bridging device 7 are securely encrypted. Similarly, the content provider's application may be configured with encryption keys to ensure that the communication channel between the bridging device 7 and the electronic key fob 3 is securely encrypted.

In certain embodiments, the application may be configured to obtain information regarding the hardware specifications of the electronic key fob 3, and/or hardware information regarding the bridging device 7. The hardware information may subsequently be used by the remotely located content provider 15 to tailor content data to the processing capabilities of the electronic key fob 3, in order to ensure that the electronic key fob 3 is able to process any content data, such as executable software code, forwarded to it from the remotely located content provider 15.

The application may be installed on the bridging device during an initial user registration process. For example, this may comprise the electronic bridging device 7 contacting the remotely located content provider 15, to initiate a secure registration procedure, in which the bridging device's identity is registered with the remotely located content provider 15, such that in a subsequent transaction, the electronic key fob 3 may be securely provisioned with content data from the remotely located content provider 15. Such a registration process helps to prevent the confidentiality of sensitive information being compromised by fraudulent bridging devices communicating with the remotely located service provider 15.

The user registration process may comprise receiving a registration request from the bridging device 7 at the content provider 15. The content provider 15 may then establish a secure communication channel with the electronic bridging device 7, using for example TLS and/or SSL. The user registration process may then comprise the user of the electronic bridging device 7 providing personal information regarding the type of services required. For example, where the desired type of services relate to financial services, the user information may comprise name of the user, financial account details, such as account number and/or user payment account details, social security details etc. Upon receipt of the user details, the remotely located content provider 15 may establish a user account with the remotely located service provider 15, and store the received information in the storage device 19. In certain embodiments, the user registration process may also comprise obtaining a unique identifier associated with the user's electronic bridging device 7, and storing the unique identifier in the user's account. In this way, the user's account is associated with the user's electronic bridging device 7, and this can be used as an additional security feature when verifying transactions received from the electronic key fob 3 and/or the bridging device 7 are not originating from fraudulent devices.

The registration process may also comprise the step of the remotely located content provider 15 providing the electronic bridging device 7 with the content provider's application (e.g. the app) which may be required to initiate subsequent data transactions between the electronic key fob 3 and the remotely located content provider 15. In certain embodiments, when the content provider's application is loaded and/or executed on the electronic bridging device 7, the application may be configured to first determine if the unique identifier of the electronic bridging device 7 is consistent with the registered identifier, by requesting confirmation from the remotely located content provider 15. This may comprise sending a data message comprising the identifier or a hash value of the identifier associated with the requesting bridging device 7 to the remotely located content provider, which content provider performs a lookup operation to determine if the device identifier is a registered identifier. This helps to ensure that only authorised devices communicate with the remotely located content provider 15.

In certain embodiments, the registration process may comprise a portable electronic device enrolment step. For example, this may comprise the electronic bridging device 7 obtaining the hardware and/or processing specifications of the electronic key fob 3, using the shared communication channel 23. Once obtained, the electronic bridging device forwards this information to the remotely located content provider 15. This information is also stored with the content provider 15 in the storage device 19, and is associated with the relevant user's account. The remotely located content provider 15 is now in possession of the hardware and processing specifications of both the electronic bridging device 7 and the electronic key fob 3. This information is used by the remotely located content provider 15 to tailor all subsequent data transactions for compatibility with the electronic bridging device 7 and the electronic key fob 3 hardware and/or processing specifications. For example, executable data content, such as executable software code from the remotely located content provider 15 can now be tailored for compatibility and performance with the portable electronic device's processing specifications.

Once the content provider's application has been installed on the electronic bridging device 7, all subsequent data transactions between the remotely located content provider 15 and the portable electronic device 3 may be managed via the application running on the electronic bridging device 7.

Figure 2:
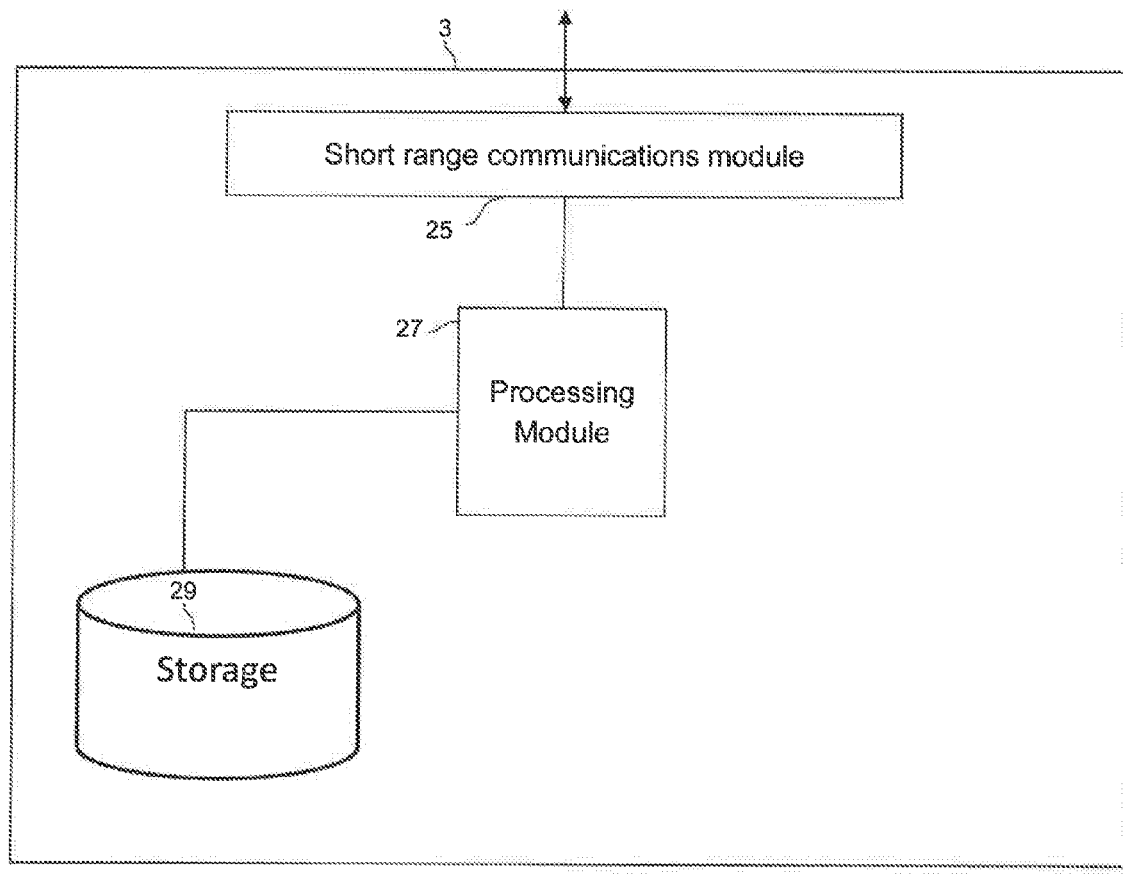
FIG. 2 is a schematic diagram of the functional modules comprised within the vehicle key fob of FIG. 1.

FIG. 2 is a schematic illustration of the functional modules comprised within the key fob 3 of FIG. 1. The key fob 3 comprises a short-range communications module 25, which as mentioned previously, may relate to an NFC transceiver module. The key fob 3 also comprises an associated processor module 27, arranged to process data received from and transmitted via the short-range communications module 25. The processor module 27 is operatively connected to the short-range communication module 25 such that received data can be processed, and processed data can be transmitted to a receiving terminal. A storage medium 29 is also comprised within the key fob 3 to store data required to enable the key fob 3 to carry out its intended functionality, and any further data subsequently provisioned to the key fob 3 by the remotely located content provider 15.

In embodiments where the key fob 3 comprises a secure element (e.g. a protected processing area), the secure element may be configured with content data received from the remotely located content provider. In certain embodiments, the secure element (SE) may be comprised in the processing module 27. In embodiments where the content data received from the remotely located content provider 15 relates to payment functionality, the SE may be configured to store all confidential algorithms and cryptographic keys required to participate in a financial transaction with the remotely located content provider 15. For example, the confidential algorithms and cryptographic keys may relate to those adopted in DES (Data Encryption Standard) and/or RSA (Rivest-Shamir-Adleman public key cryptosystem).

In those embodiments where the present method is used to provision financial transaction functionality to the key fob 3, the remotely located content provider 15 may relate to the issuer and/or issuing bank. Where the SE is not comprised in the processing module 27, then it is to be appreciated that the SE is provided with native processing capabilities, such that processing of confidential transaction data occurs in a controlled, concealed environment. This ensures that the confidentiality of sensitive algorithms and encryption keys, may not be compromised by an eavesdropper.

Figure 3:
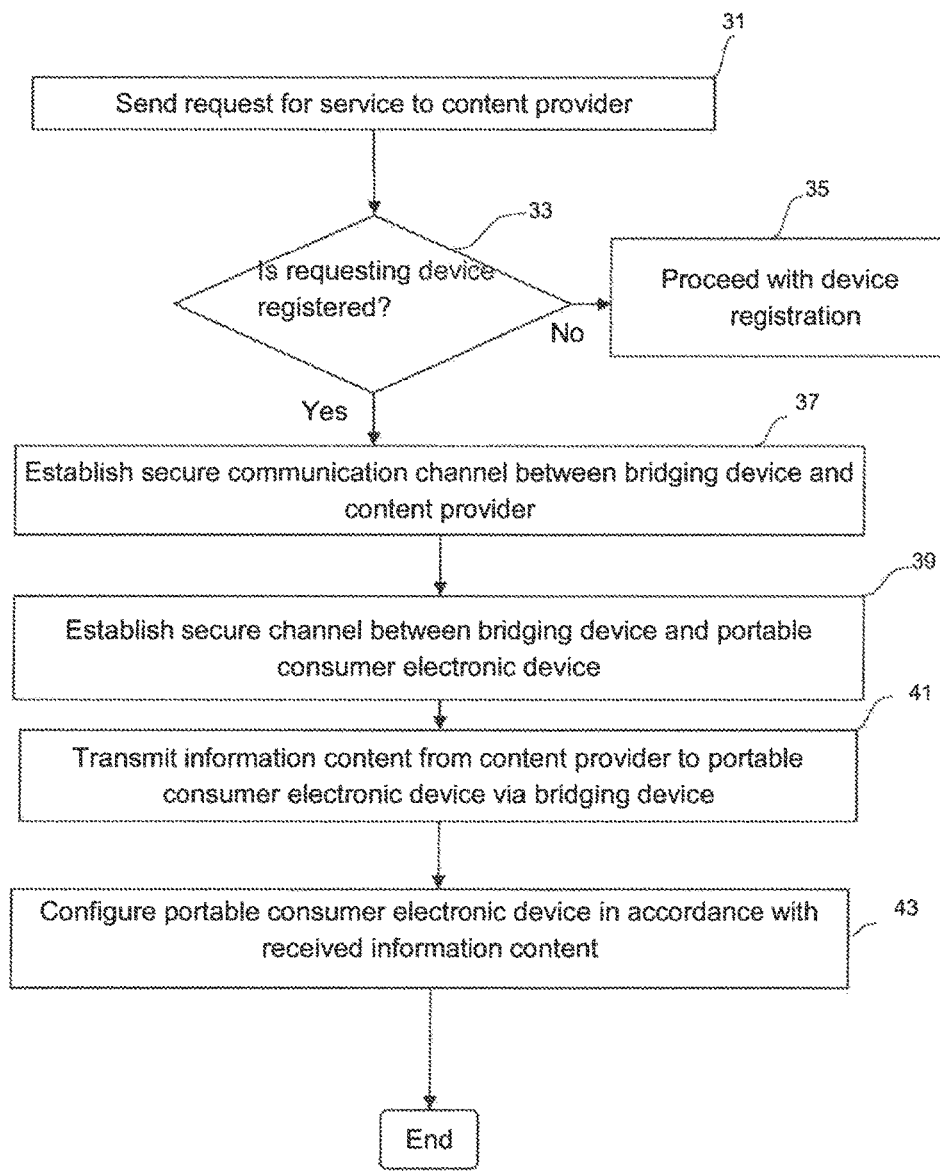
FIG. 3 is a process flow chart outlining the different method steps required to provision the vehicle key fob of FIGS. 1 and 2 with content data from the remotely located content provider of FIG. 1.

FIG. 3 is a process flow chart outlining the different steps required to provision content data to the key fob 3 of FIGS. 1 and 2, in accordance with an embodiment of the disclosure, and once user registration has already taken place. Accordingly, the remotely located content provider 15 is already in possession of information indicative of the electronic key fob's hardware and processing specifications, in addition to the hardware and processing specifications of the electronic bridging device 7 and its associated unique identifier. The method is initiated by sending a request for service from the bridging device 7 to the remotely located content provider 15, at step 31. The request will comprise the bridging device's unique identifier, and is preferably issued by a user using the application previously installed on the bridging device 7 during the initial, aforementioned user registration process. For example, this may be achieved by running the application natively on the bridging device 7 and selecting the appropriate service request from within the application. Once the request has been received at the remotely located content provider 15, the content provider 15 determines, at step 33 if the request has been received from a previously registered bridging device. If it is determined that the device is not registered, then the remotely located content provider 15 proceeds with user registration, at step 35, as previously described. Following successful completion of user registration, the method proceeds as described below.

Once it is determined that the request has been received from a registered device a secure communication channel is established between the bridging device 7 and the content provider 15, at step 37. The secure communication channel is established using the secure protocols the application (which resides on the bridging device 7) has been configured to carry out. As mentioned previously, this secure communication channel may be established using an existing wide area network (WAN) such as the internet. Similarly, where the bridging device 7 relates to a smartphone, then the secure communication channel may be established using a mobile telecommunications network, such as a 4G (LTE) telecommunications network.

A second secure communication channel is established between the bridging device 7 and the key fob 3, at step 39. This second secure communication channel is established using the key fob's native short-range communications transceiver 5, namely, the key fob's NFC module where provided; and the bridging device's NFC module. In certain embodiments an initial data exchange between the key fob 3 and the bridging device 7 may be required to establish the second secure communication channel 23. This may be achieved using the protocols provided for by the application on the bridging device 7. This procedure is commonly referred to as a 'handshake', and provides the key fob 3 and the bridging device 7 with a means of verifying that any received data communications have originated from the desired source.

Once both secure communication channels have been established, content data (e.g. data) is transmitted from the content provider 15 to the key fob 3, via the bridging device 7, using the established secure communication channels, at step 41.

Once the content data is received at the key fob 3, it may be executed and the key fob 3 configured with new functionality in accordance with the received content data, at step 43.

Whilst the aforementioned embodiments have been described with respect to an electronic key fob, this was for non-limiting illustrative purposes only, and in alternative embodiments the portable electronic device may relate to a smartwatch, or any other type of wearable electronic device comprising a short-range transceiver and associated processing means.

Similarly, whilst the aforementioned embodiments have been described in relation to the portable electronic device being provisioned with content data to enable it to participate in a financial transaction, the method of the present disclosure may be used to impart any type of functionality to the portable electronic device. For example, the method may be used to configure an existing bank card, such as an integrated circuit (IC) card, with functionality for operating a contactless door entry system.

Similarly, the herein disclosed method may be used to configure an existing contactless travel card, such as an Oyster™ card with payment functionality, or with keyless entry functionality.

The skilled reader will appreciate that the herein described method may be adapted to impart a diverse spectrum of functionality on portable electronic devices that were not originally conceived with the imparted functionality at their source of manufacture, and such alternatives fall within the scope of the present disclosure.

Similarly, modifications may be made to certain steps of the above-described method without departing from the scope of the present disclosure. For example, in certain embodiments the bridging device may establish the second communication channel with the remotely located content provider, and store content data received from the remotely located content provider for subsequent forwarding to the portable electronic device, once the first communication channel has been established between the portable electronic device and the bridging device. In this way, the portable electronic device may be provisioned with the content data at a later time, once the second communication channel has been ceased.

Although the present disclosure has been described in connection with specific embodiments, it should be understood that various changes, substitutions, and alterations apparent to those skilled in the art can be made to the disclosed embodiments without departing from the spirit and scope of the disclosure as set forth in the appended claims.

The invention claimed is:

1. A method of provisioning a portable electronic device with content data from a networked remotely located content provider, the portable electronic device comprising a first short-range communications module, the method comprising the steps of:
    establishing a first communication channel between a networked electronic bridging device and the portable electronic device, the electronic bridging device comprising a second short-range communications module, and the first communication channel being established using the first and second short-range communications modules, said electronic bridging device being a smartphone;
    establishing a second communication channel between the networked electronic bridging device and the networked remotely located content provider;
    provisioning the portable electronic device with the content data by transmitting the content data from the remotely located content provider to the portable electronic device using the first and second communication channels;
    the content data including an executable application that performs the steps of:
        obtaining one or more hardware specifications of the portable electronic device;
        providing the one or more hardware specifications to the remotely located content provider;
        receiving from the remotely located content provider subsequent content data tailored to the one or more hardware specifications of the portable electronic device; and
        the subsequent content data provisioning the portable electronic device to execute secure financial transactions using a near field communication point-of-sale terminal.

2. The method of claim 1, wherein the portable electronic device comprises a secure element operatively connected to the first short-range communications module, the secure element being configured to provide a secure processing environment in which the confidentiality of data received via the first short-range communications module is maintained, and the provisioning step comprises storing the content data in the secure element.

3. The method of claim 2, wherein the secure element is configured in accordance with the GlobalPlatform standard.

4. The method of claim 1, wherein the portable electronic device comprises a processor operatively communicable with the first short-range communications module, the content data is an executable data file associated with a functionality, and the method further comprises the steps of:
    executing the received executable data file on the portable electronic device using the processor; and
    configuring the portable electronic device with the functionality associated with the executable data file.

5. The method of claim 4, wherein the executable data file relates to a payment application, and the configuring step comprises configuring the portable electronic device with payment functionality enabling the portable electronic device to initiate a financial transaction with a point of sale terminal using the portable electronic device's first short-range communications module.

6. The method of claim 1, further comprising:
    receiving, at the networked electronic bridging device, an executable application from the remotely located content provider, following establishment of the second communication channel, via the second communication channel;
    installing the executable application on the bridging device, the bridging device being configured when the executable application is installed, to receive and store the content data received from the remotely located content provider; and
    transmitting the received content data to the portable electronic device via the first communication channel, when the first communication channel is established.

7. The method of claim 1, wherein the portable electronic device's first short-range communications module comprises any one of:
    a) a near-field communications (NFC) module;
    b) a Bluetooth communications module;
    c) a ZigBee communications module; or
    d) a short-range infrared communications module.

8. The method of claim 1, wherein the second communication channel is a telecommunications network.

9. The method of claim 1, wherein the second communication channel is established over the internet.

10. An electronic bridging device comprising:
a first communication module arranged to establish a first communication channel with a portable electronic device;
a second communication module arranged to establish a second communication channel with a remotely located content provider;
the electronic bridging device is configured to receive content data from the remotely located content provider via the second communication channel, and to forward the received content data to the portable electronic device via the first communication channel, said electronic bridging device being a smartphone;
the content data including an executable application that causes a processor in the portable electronic device to perform the steps of:
obtaining one or more hardware specifications of the portable electronic device;
providing the one or more hardware specifications to the remotely located content provider;
receiving from the remotely located content provider subsequent content data tailored to the one or more hardware specifications of the portable electronic device; and
the subsequent content data provisioning the portable electronic device with executable instruction that cause the portable electronic device to execute secure financial transactions using a near field communication point-of-sale terminal.

11. The electronic bridging device of claim 10, wherein the second communication module is a long-range communications module, and the first communication module is a short-range communications module.

12. The electronic bridging device of claim 10, wherein the first communication module is any one of:
a) a near-field communications (NFC) module;
b) a Bluetooth communications module;
c) a ZigBee communications module; or
d) a short-range infrared communications module.

13. The electronic bridging device of claim 10, wherein the second communication module comprises a 3G and/or 4G transceiver.

14. A method of provisioning a portable electronic device with content data from a networked remotely located content provider using a networked electronic bridging device, the portable electronic device comprising a first short-range communications module and the electronic bridging device comprising a second short-range communications module, the method comprising:
establishing a first communication channel between the portable electronic device and the electronic bridging device using the first and second short-range communications module;
establishing a second communication channel between the electronic bridging device and the remotely located content provider;
receiving content data from the remotely located content provider at the electronic bridging device via the second communication channel, and forwarding the received content data to the portable electronic device via the first communication channel, said portable electronic device selected from the group consisting of: (a) a key fob; (b) a smartwatch; and (c) an integrated circuit (IC) card;
the content data including an executable application configured to cause the portable electronic device to perform the steps of:
obtaining one or more hardware specifications of the portable electronic device;
providing the one or more hardware specifications to the remotely located content provider;
receiving from the remotely located content provider subsequent content data tailored to the one or more hardware specifications of the portable electronic device; and
the subsequent content data provisioning the portable electronic device to execute secure financial transactions using a near field communication point-of-sale terminal.

15. The method of claim 1, wherein said portable electronic device is selected from the group consisting of: (a) a key fob; (b) a smartwatch; and (c) an integrated circuit (IC) card.

16. The method of claim 1, further comprising:
registering a user of the electronic bridging device prior to said establishing steps.

17. The method of claim 16, wherein the registering step includes transferring personal details concerning the user from the electronic bridging device to the networked remotely located content provider.

18. The method of claim 1, further comprising:
transferring information regarding the characteristics of the portable electronic device from the electronic bridging device to the networked remotely located content provider.

19. The method of claim 18, further comprising, prior to the transferring step:
retrieving, from the portable electronic device, the information regarding the characteristics of the portable electronic device.

20. The method of claim 1, further comprising:
verifying, at the networked remotely located content provider, a unique identifier associated with the electronic bridging device.

* * * * *